June 21, 1932.  R. E. PARIS  1,864,051
PERFORATED CARD CONTROLLED MACHINE
Filed Aug. 13, 1927   7 Sheets-Sheet 7
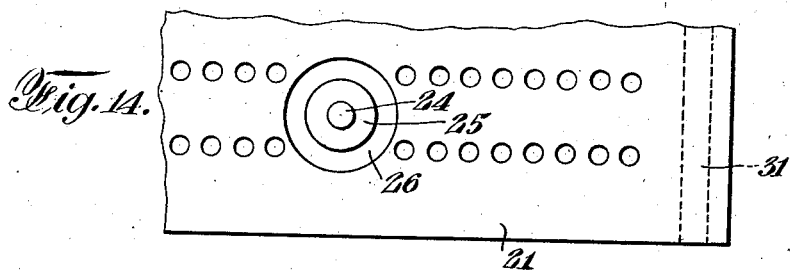
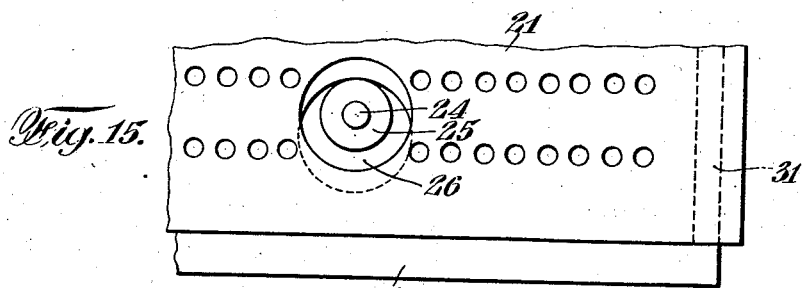
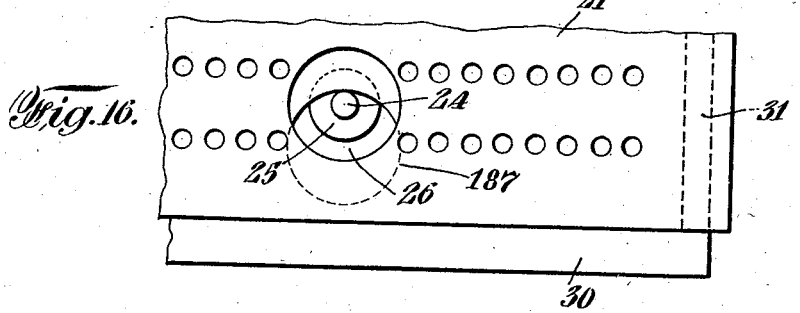
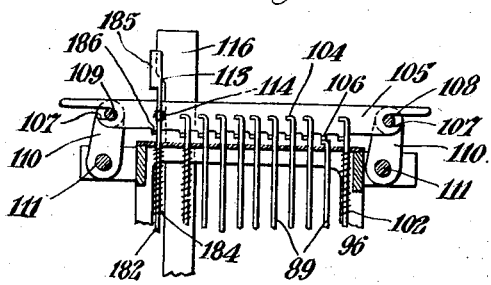
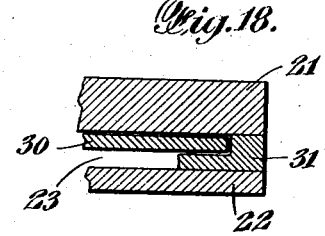
Inventor
Robert Edward Paris
By his Attorney Patented June 21, 1932

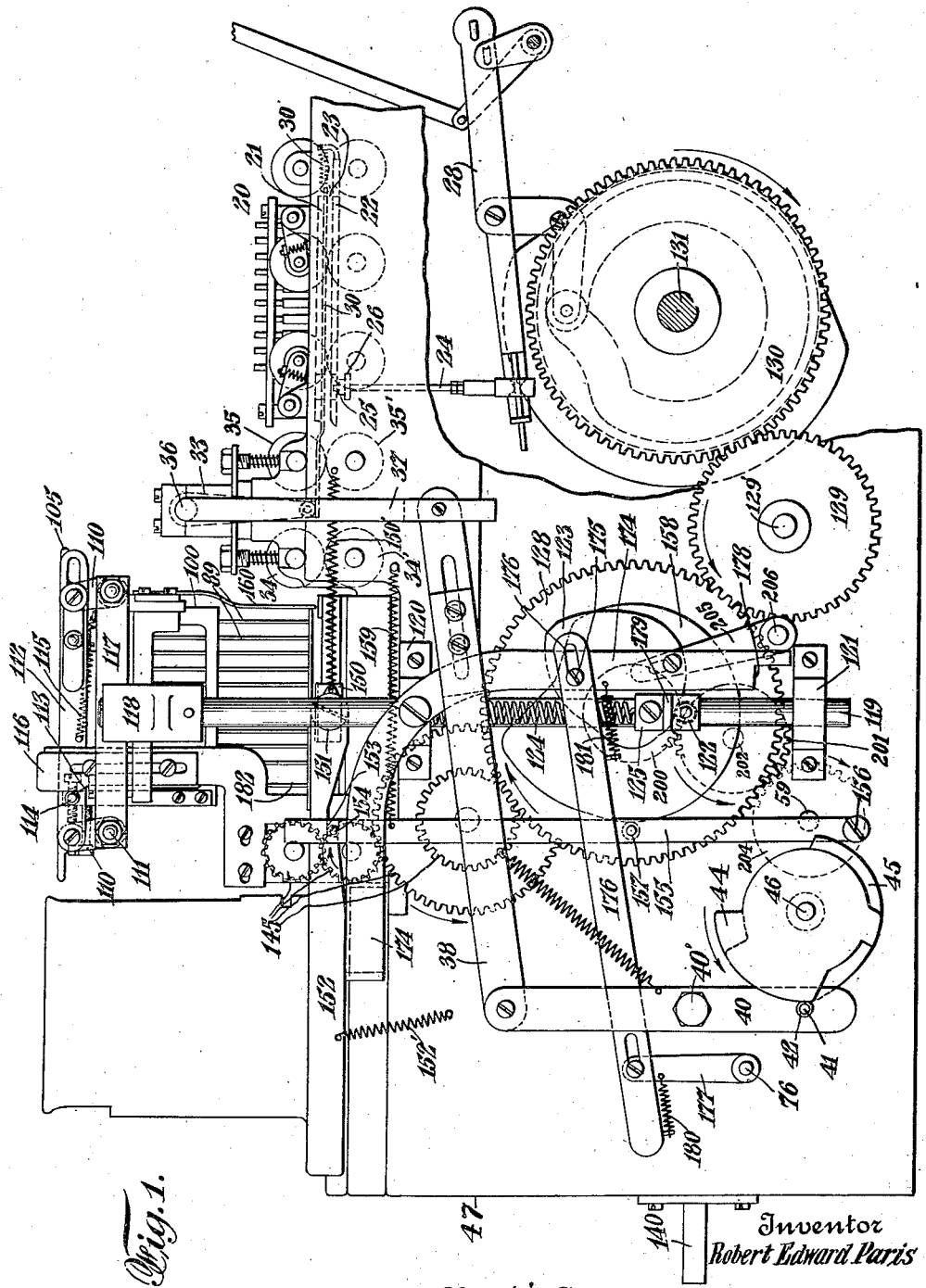

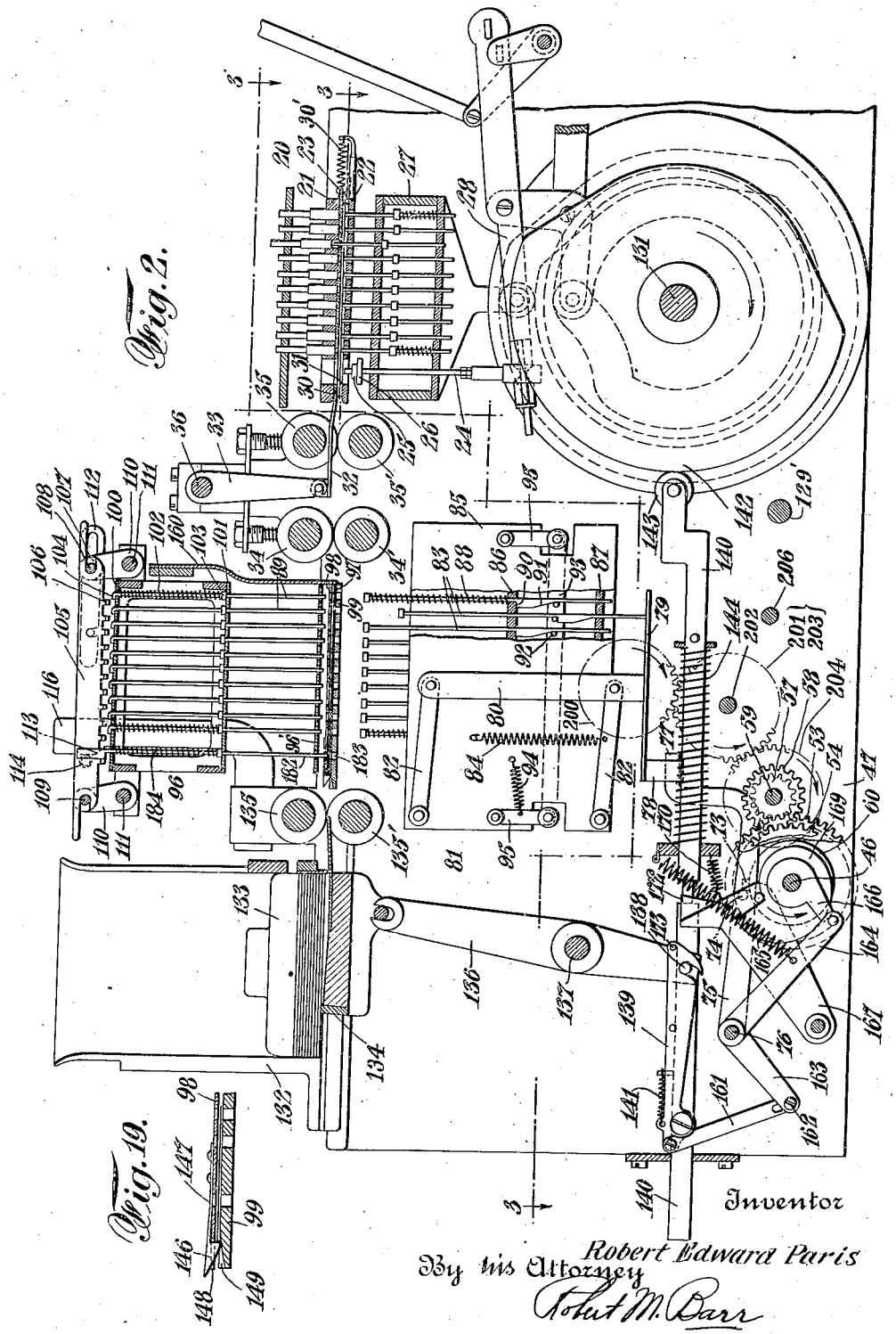

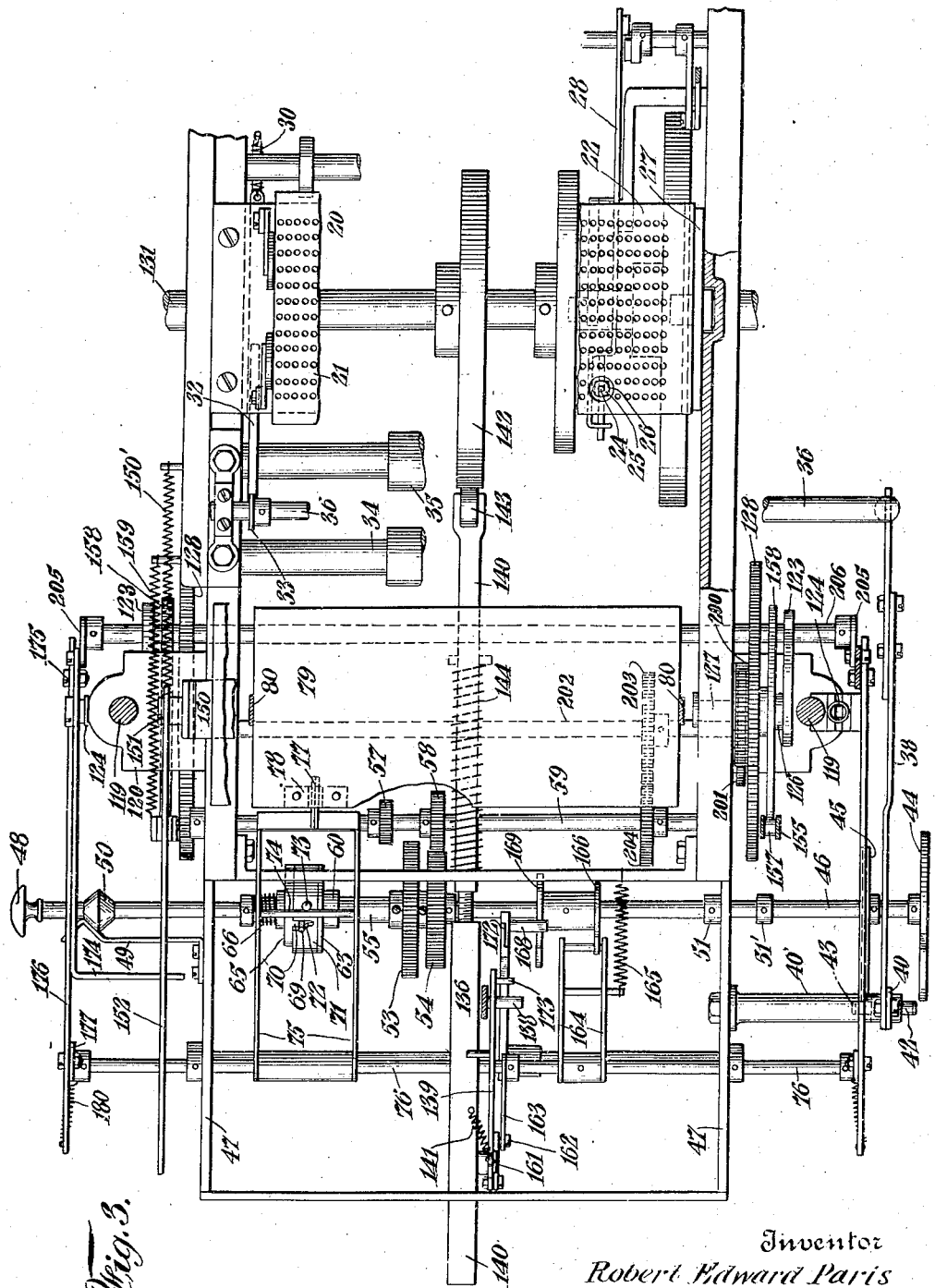

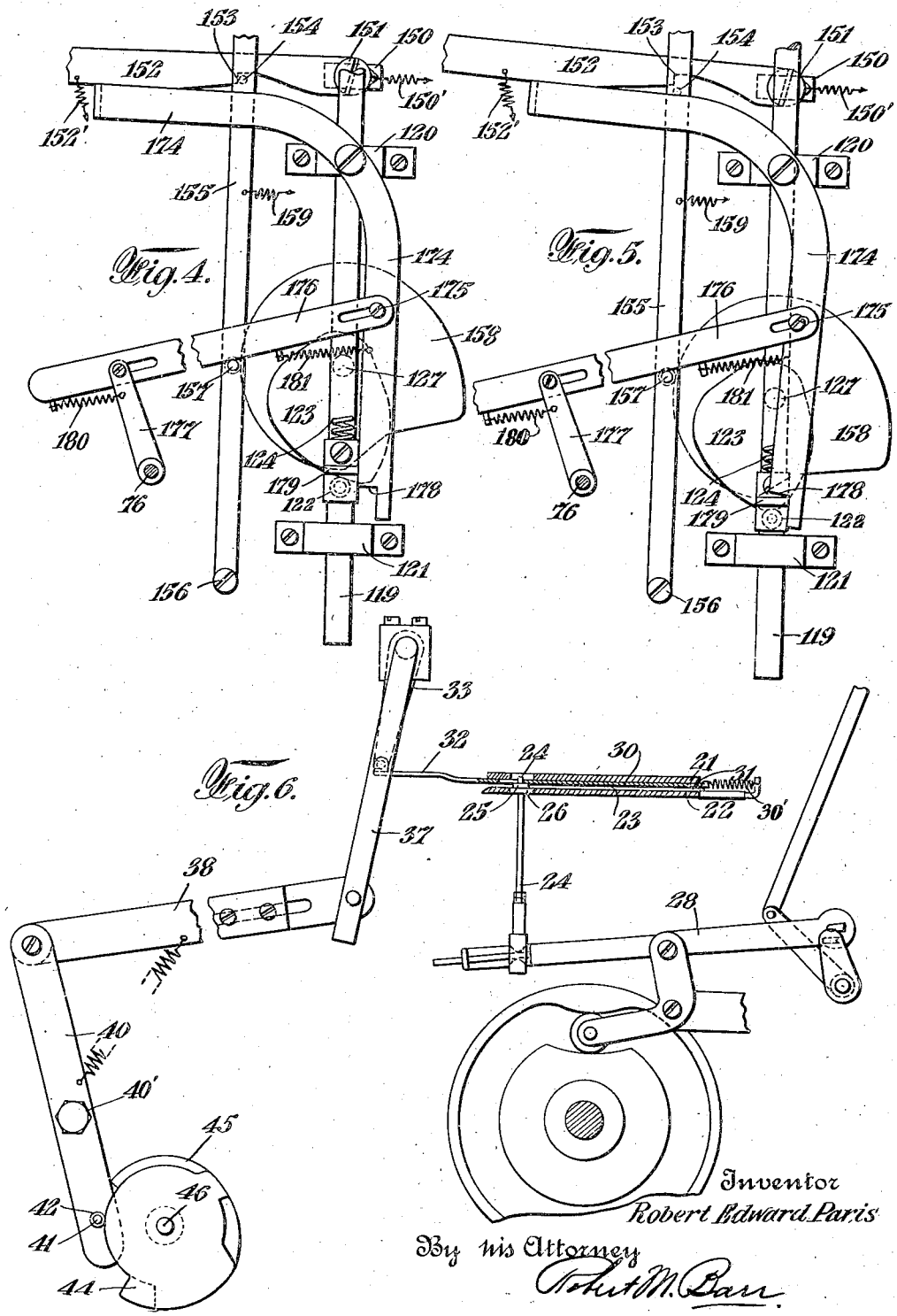

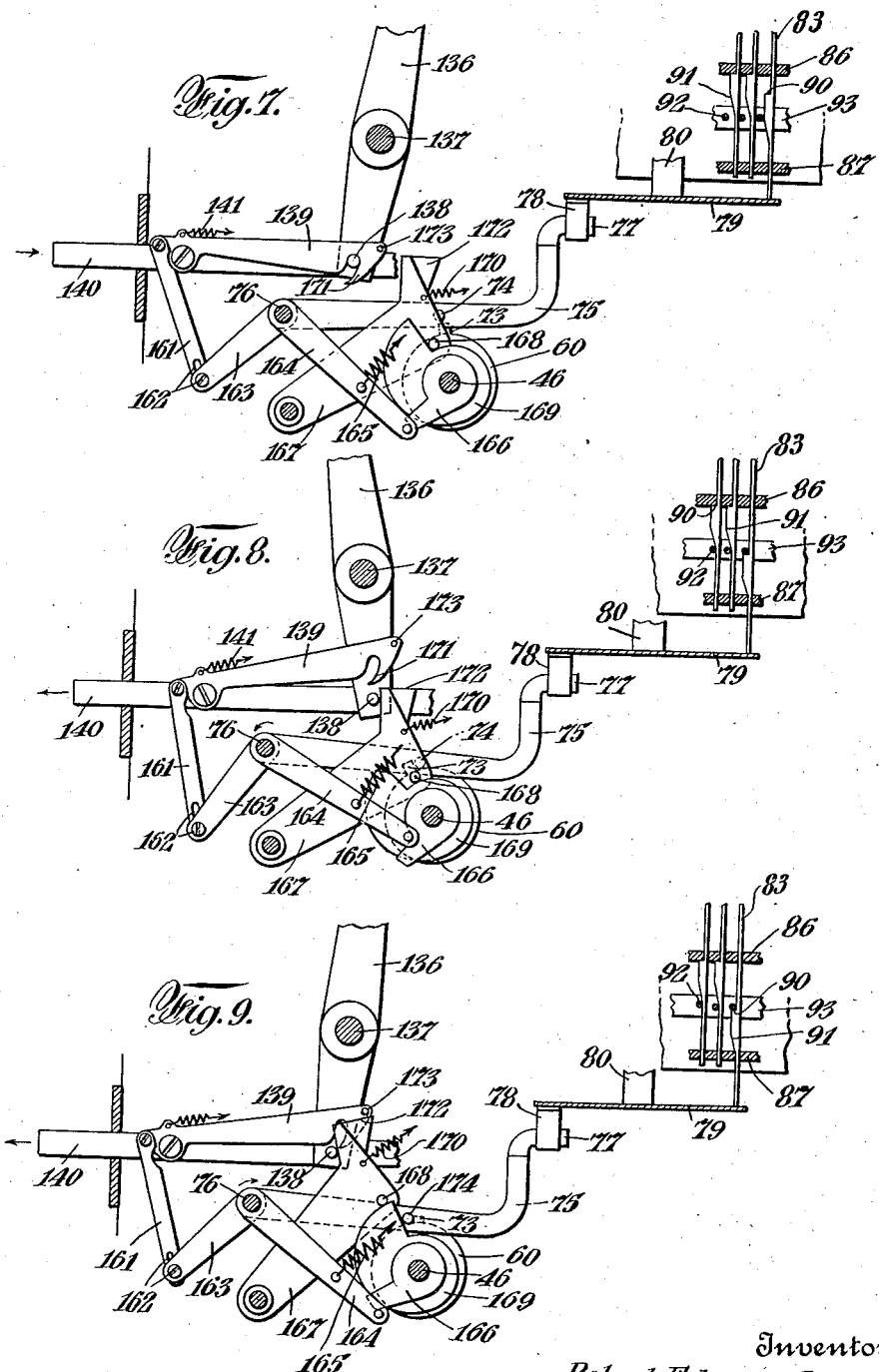

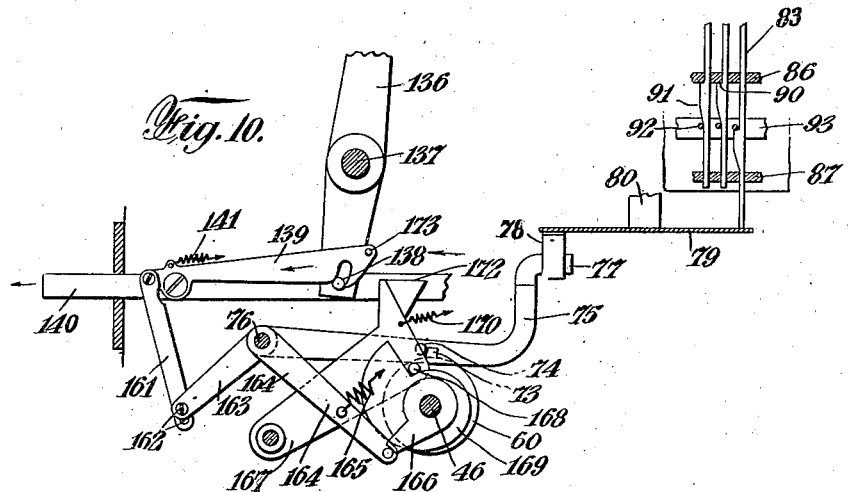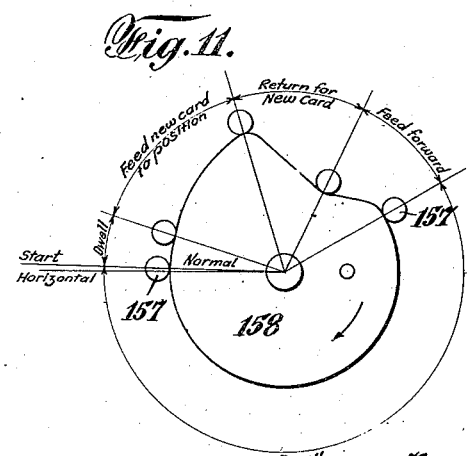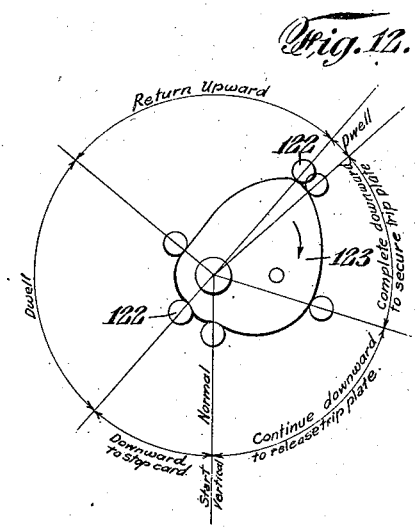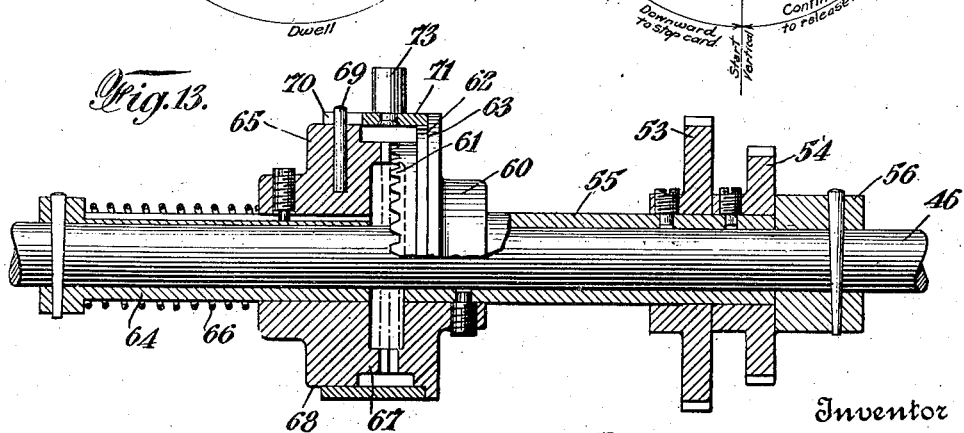

1,864,051

UNITED STATES PATENT OFFICE

ROBERT EDWARD PARIS, OF NEW YORK, N. Y., ASSIGNOR, BY MESNE ASSIGNMENTS, TO REMINGTON RAND INC., OF NEW YORK, N. Y., A CORPORATION OF DELAWARE

PERFORATED CARD CONTROLLED MACHINE

Substitute for or continuation in part of applications Serial No. 104,713, filed April 26, 1926, and Serial No. 141,162, filed October 12, 1926. This application filed August 13, 1927. Serial No. 212,731.

This application is a substitute for or a continuation in part of applicant's prior applications Serial Nos. 104,713 filed April 26, 1926, and 141,162 filed October 12, 1926.

The present invention relates to tabulating, accounting or other perforated card controlled machines, and more particularly to a card feeding mechanism operating under control of a mechanism influenced by a change of designation from one card to another or from one group of cards to another group.

In machines heretofore in use, of the character to which the present invention is applicable, it has been and is the practice to provide a control for the card feeding mechanism whereby, when there is a change of designation from one group of cards to another, the feeding of cards ceases while the machine automatically takes the total of the group of cards preceding the change of designation. This cessation of feeding is also long enough to permit the desired space cycle. Since speed is an important factor in the commercial success of perforated card controlled machines, this periodic stopping of the card feed presents certain difficulties in attaining this end.

Some of the objects of the present invention are to provide an improved card feeding control for perforated card controlled machines; to provide a card feed for perforated card controlled machines which functions continuously irrespective of change of designation from one group of cards to another, to provide means for automatically varying the feeding speed of record cards according to conditions in the machine to which the cards are fed; to provide an improved space and total control for tabulating machines; to provide means whereby the use of separate space and total cards is dispensed with, and the loss of time due to intermittent card feeding is eliminated; to provide means for increasing the production of tabulating machines wherein groups of cards of different group designation are employed; to provide a designation control mechanism for a tabulating or other machine whereby changes from one group of cards to another are detected and the change automatically made without discontinuing the operation of the tabulating machine or the feeding of cards thereto, and to provide other improvements as will hereinafter appear.

In the accompanying drawings Fig. 1 represents a side elevation of a designation control and card feeding mechanism embodying one form of the present invention; Fig. 2 is a vertical sectional view of the same taken on a plane parallel with the plane of Fig. 1; Fig. 3 is a sectional plan view taken substantially on line 3—3 of Fig. 2, parts being broken away for clearness; Fig. 4 is a fragmentary detail view indicating the position of certain parts at the instant of setting when a change of designation has occurred; Fig. 5 is a view similar to Fig. 4 but showing the parts as the pin box completes its downward stroke; Fig. 6 is a fragmentary view showing the mechanism for moving the total controlling plate; Fig. 7 is a detail view of the feeding mechanism taken substantially at the same instant as Fig. 4; Fig. 8 is a view similar to Fig. 7 but taken at the same instant as Fig. 5; Fig. 9 is a view similar to Figs. 7, 8 but showing the parts when the machine is nearing the completion of the total taking cycle; Fig. 10 is a view similar to Figs. 7, 8, and 9 but showing the parts at the completion of the total taking cycle; Fig. 11 is a detail view of the feed controlling cam; Fig. 12 is a similar view of the pin box reciprocating cam; Fig. 13 is a longitudinal sectional view of the cam shaft and clutch; Fig. 14 represents a detail of the registration plate of the tabulating machine showing the designation control plate in its normal position; Fig. 15 represents the same showing the control plate in position to cause the carrying out of a total operation; Fig. 16 represents the same showing the designation control plate in position for the carrying out of a space taking operation; Fig. 17 represents a fragmentary sectional view of a portion of the designation control analyzing unit at an instant when the locking bar becomes effective; Fig. 18 represents a fragmentary detail sectional view showing the manner of mounting the designation control plate; Fig.

19 is an enlarged sectional detail of a portion of the designation pin box feed mechanism.

Referring to the drawings, one form of the present invention is shown as applied to a tabulating machine, such for example as shown in Letters Patent to Powers No. 1,245,503, but only such parts thereof are here illustrated as will be necessary to a clear understanding of the invention. Thus, portions of the analyzing unit 20 (Figs. 1, 2 and 3), of such a machine are shown with the card registration plates 21 and 22 which provide the card passage 23, and incident thereto a total and space control pin 24 appears of the type having shoulders 25 and 26 which are automatically arranged to so vary the vertical position of the pin 24 as to set the machine control to carry out a space operation or a total operation as the case may be. This control pin 24 is vertically slidable in the analyzing pin box 27 and is connected at its lower end to a rock arm 28 which determines by its position whether the total taking mechanism is to function or a space operation is to take place. This arm 28 and its associated parts are described in the patent to Powers No. 1,245,503 to which reference may be had for details which here seem unnecessary to describe. Heretofore, special space and total cards have been necessary to position the pin 24 for the desired operation, and such extra cards have been placed by hand at the places in a group or groups of cards where operation of the pin 24 is to occur.

For the purpose of causing the pin 24 to operate, one form of the present invention provides a perforated plate 30 (see also Figs. 14, 15 and 16), corresponding generally in size and shape to a record card and arranged normally with its perforations in alignment with the perforations of plate 21. This plate 30 is preferably supported close to the lower face of the registration plate 21 by spacer bars 31, Fig. 18, of L-shaped cross-section which permit sliding movement of plate 30 and prevent plate 30 from encroaching upon and restricting the card passage 23. Spacer bars 31 are secured between plates 21 and 22 and determine the size of card passage 23 and also serve to guide plate 30. Movement is transmitted to the slide plate 30 by projecting arms 32 (Figs. 2, 3 and 6), which connect respectively to arms 33, suspended between two pairs of feed rolls 34, 34' and 35, 35' from a rock shaft 36 to which an end of each is fast for movement therewith. This rock shaft 36 is arranged to vary the stroke or action of the plate 30 in order that it may be moved to engage the pin shoulder 25 to position the pin 24 for one operation and to engage the pin shoulder 26 to position the pin 24 for its other control operation.

The connection between arms 32 and 33 is a pin-and-open-slot connection, and springs 30' tend constantly to draw the plate so as to complete this connection. This flexible connection between arms 32 and 33 is provided so as to permit spring pressed pins of pin box 27 to detain the plate while permitting arms 33 to move with shaft 36 to conform to the required timing of parts of the tabulating machine.

In order to thus vary the rocking movement of the shaft 36, it is bent downwardly at one end into a rock-arm 37 the lower end of which is pivotally connected with a driven bar 38, the bar 38 being pivotally supported by the upper end of a rock lever 40. This lever 40 is fulcrumed on shoulder-stud 40' and with a pin 41 projecting at opposite sides therefrom and forming a journal for two cam rollers 42 and 43, (Fig. 3), the former being arranged to cooperate with a space-total-space cam 44, and the latter with a space total cam 45. The two cams 44 and 45 are fixed to a shaft 46 near one end thereof, the shaft 46 being rotatably mounted in bearings of the frames 47 and also so mounted that it can be shifted transversely of the frames 47 to make operating connection between cam 44 and its co-operative roller 42 or between cam 45 and its co-operative roller 43. One end of this shaft 46 is provided with a hand knob 48 so that the shaft 46 can be manually shifted to select the cam for the desired operation. Thus when the shaft 46 is shifted to the right, as seen in Fig. 3, the cam 45 will be brought into co-acting relation with the cam roller 43 to carry out a space-total operation, and when moved in the opposite direction the cam 44 will be brought into co-acting relation with the cam roller 42 to carry out a space-total-space operation. When one cam is operating with its respective roller, the other cam is out of contact with its roller. The shaft 46 is held in either adjusted position by a spring detent 49 which engages opposite sides of a shoulder or detent lug 50, secured on the shaft 46, and the amount of sliding movement permitted shaft 46 is determined by collars 51, 51' secured on said shaft on opposite sides of one of the side frames 47.

Since the space-total-space cam 44 requires three analyzing strokes of the pin box 27 for each revolution made by it, while the space-total cam 45 requires two analyzing strokes of the pin box 27 for each revolution made by them, provision is made for varying the driven speed of the shaft 46. In the present instance, two driven gears 53 and 54, (Figs. 1, 2 and 13), are pinned or otherwise rigidly secured to a sleeve 55 freely rotatable upon the shaft 46, and movable transversely of the machine with said shaft 46, but held against movement longitudinally on said shaft by a collar 56 pinned to the shaft at one end of said sleeve and by clutch mechanism hereinafter described, mounted on shaft 46 at the other end of sleeve 55, as shown in Fig. 13. The gears 53 and 54 are movable with shaft 46 so as to bring them respectively into mesh with respective driving gears 57 and 58, (Fig. 3), fixed to a driving shaft 59 having bearings in the frames 47. When the gears 53 and 57 are in mesh, the gears 54 and 58 are out of mesh and vice versa and the speed ratio of each pair of meshing gears is such that shaft 59 makes two revolutions while the gear 54 makes one revolution and makes three revolutions while the gear 53 makes one revolution. Thus, shifting the driven shaft 46 in a direction to intermesh the gears 54 and 58 results in two analyzing strokes of the pin box 27 while the space-total cam 45 makes one revolution, and by shifting the driven shaft 46 in the direction to intermesh the gears 53 and 57 while unmeshing the gears 54 and 58, results in three analyzing strokes of the pin box 27 while the space-total-space cam 44 makes one revolution. As one or the other pair of gears is always in mesh during operation of the machine, it will be seen that the sleeve 55 will always rotate when shaft 59 is rotating.

For transmitting motion from the sleeve 55 to shaft 46, a clutch mechanism is provided comprising a clutch body 60 secured to the end of sleeve 55, as shown in Fig. 13, such clutch body 60 being formed with a toothed engaging portion 61, an annular supporting shoulder 62, and an annular stop shoulder 63. A sleeve 64 is pinned to shaft 46 and carries a clutch body 65 which is splined to said sleeve 64 and is constantly urged toward the clutch body 60 by a spring 66. The clutch body 65 is formed with a toothed engaging portion 67 adapted to engage the toothed portion 61 of clutch body 60, and with an annular supporting face 68. A pin 69 projecting from the member 65 through its supporting face 68, extends into a slot 70 formed in a ring 71 supported on the faces 68 and 62 of the clutch members 65 and 60, and resting against the stop shoulder 63. The slot 70 has an oblique face 72, (Fig. 3), and when the ring 71 is prevented from rotating with the clutch members, this oblique face 72 forces pin 69 out so as to disengage the clutch member 65 from the clutch member 60. The ring 71 is provided with a pin 73, (see also Figs. 2 and 10), which normally rests against a transverse rod 74 thereby disconnecting the clutch so that shaft 46 stands idle. The rod 74 forms part of a frame 75 which is loosely pivoted at one end on a cross rod 76 and has its free end formed with a nose 77 extending into a bracket or U-shaped hanger 78 secured to and depending from the bottom of a reciprocable plate 79 here termed the designation control plate. This plate 79 is supported by two arms 80 upstanding respectively from its ends and straddling a designation control pin box 81, while links 82 pivoted between the arms 80 and the pin box 81 permit movement of the plate 79 with respect to the pin box 81. The plate 79 corresponds generally in size to a record card and its position is below the pin box 81 and in the path of the pins 83 thereof. Springs 84 stretched between the pin box 81 and the lower plate supporting links 82, normally tend to hold the plate 79 against the lower ends of the pins 83 and to return the plate 79 to that position in case it has been held away therefrom by a locked designation control pin 83. The pin box 81 consists of a frame 85 having upper and lower guide plates 86 and 87 for slidably mounting the pins 83 which are held extended by separate springs 88 into the path of movement of the respective analyzing pins 89. That portion of each of the pins 83 lying between the plates 86 and 87 is provided with a shoulder 90 to limit the upward movement of the pin, and a cam 91 to engage a transverse wire 92 passing through a transversely movable latch bar 93. Thus a grid-like frame is formed having as many wires 92 as there are transverse rows of the pins 83 so that when any pin of a row is depressed the latch bar 93 of that row will be shifted to move the grid frame and release any pins 83 which are at that time locked in the lower position. A spring 94 stretched to a fixed point ensures the automatic return of the grid frame and its wires 92. A support for the latch bars 93 and also for producing a straight line motion is provided by links 95 attached to shafts supported in frame 85.

For selectively actuating the designation control pins 83, a supplemental analyzing pin box 96, (Fig. 2), is mounted for reciprocating movement above the designation control pin box 81 and on the opposite side of a card registration passage 97, formed of upper and lower registration plates 98 and 99. The arrangement of the two pin boxes is such that the pins 89 are respectively aligned in superposed relation with the control pins 83 so that any pin 89 passing through a card perforation will engage and push its corresponding pin 83 down, and the length of the stroke of the pin 89 is such as to move the pin 83 to the position where its shoulder 90 can be locked by the wire 92 of the latch bar 93 for the row of the pin considered. The registration passage 97 lies substantially in the same horizontal plane as the registration passage 23 of the analyzing unit 20 and between the two are located the pairs of feed rolls 34, 34' and 35, 35' for receiving the cards from the passage 97 and delivering them, one at a time, to the passage 23. The supplemental pin box 96 is provided with upper and lower pin guide plates 100 and 101 in which the pins 89 are slidably mounted, while coil springs 102 respectively acting against shoulders 103 of the pins maintain the latter in proper projected position and return them to such position when pressed away therefrom by engagement with a card. A plate 96' guides the ends of pins 89 and protects them and the plate 98.

In order to lock those pins 89 which pass through perforations in the card against vertical movement so that their movement is transmitted to the pins 83, the upper ends of the pins 89 project through the top plate 100 and terminate respectively in heads 104 which are all offset from the shank of the pins laterally in the same direction. Parallel to each transverse row of projecting pin heads 104 there is a reciprocable keeper 105 provided having a plurality of lugs 106 outstanding from the face thereof toward the row of pins and these lugs 106 correspond in number to the number pins and are spaced so that each can pass through the respective spaces between the pairs of pins. Normally the lugs 106 are respectively in register with the aforesaid pin spaces so that any pin can be moved vertically upward without interference from lugs 106. As here shown, the keepers 105 are separately removable and for that purpose each is provided with bifurcated ends forming grooves 107 to respectively form seats for rods 108 and 109 which are supported by links 110 pivoted to rods 111 on the pin box frame 96. Thus a rod 108 passes along one side of the machine to form a support for one end of the keepers in use and for the side bars 112 thereof, and at the opposite side there is another rod 109 similarly arranged to support the opposite ends of the keepers 105 and side bars 112. This reference to keepers 105 in use is made to make it clear that preferably only such keepers 105 are placed on the analyzing unit as correspond to a row of pins which are for designation group control and hence selection may be made at will of any row or rows for designation control purposes. Normally the keepers 105 are in the position shown in Fig. 2 with the lugs 106 opposite the spaces between pins and are held in this position by reason of cam shoulders 113, (see also Figs. 1 and 17), in the path of rollers 114 holding the latter against the tension of springs 115 normally tending to project the keeper or keepers 105 in a direction to bring the lugs 106 over the respective heads 104 of the pins 89. It will be understood that there are two cam shoulders 113 carried respectively by standards 116 up-standing at opposite ends of the machine and mounted upon a stationary part of the machine such as the base which carries the registration plate 99. In connection with these cam shoulders 113, it should be noted that each is long enough to maintain the keepers 105 in their normal unlocking position until the lower ends of the pins 89 have reached such analyzing position as will bring the heads 104 of those pins which do not find perforations in the card above the lugs 106. When this occurs, the downward movement of the analyzing unit has brought the lugs 114 beyond the cam shoulders 113 so that the springs 115 swing the rod 109 clockwise as seen in Fig. 2 and thus project the lugs 106 over those pins which have passed through perforations in the card and thereby hold them against vertical movement engaging the lower pins 83. The offset portions of the pins 89 which have been raised by the cards allow the lugs 106 to pass freely to this locking position as shown in Fig. 17.

As a means for vertically reciprocating the analyzing unit, end bars 117, (Fig. 1), are connected between the projecting ends of the pivot rods 111 and are respectively connected to heads 118 which are fast to operating slide rods 119 guided in upper and lower bearings 120, 121, of the machine frame. Motion is simultaneously transmitted to these rods 119 for the down stroke of the analyzing unit by the provision of cam rollers 122 rotatably carried by the rods 119 and extending respectively into the path of operating cam 123. The return or up stroke of the analyzing unit takes place in the present instance through the provision of coil springs 124 which are stretched respectively between anchoring elements 125 (Fig. 1) on the moving rods 119 and the upper fixed bearings 120. These cams 123 are fastened to respective sleeves 126, Fig. 3, journaled on studs 127 secured to the frame, which sleeves 126 are respectively driven by gears 128 in mesh respectively with gears 129, which are secured to shaft 129' and one of which in turn meshes with driven gear 130 fixed to a shaft 131, this last being the driven shaft by which the pin box of the tabulating machine is reciprocated. The speed ratio of the gearing is one to one in order that the two analyzing pin boxes reciprocate in unison. Secured to one of the gears 128 is a gear 200' which meshes with a gear 201 secured to an idler shaft 202. A gear 203, (Fig. 2), is pinned to shaft 202 and meshes with a gear 204 secured to and for rotating shaft 59.

For the purpose of feeding record cards successively to the registration passage 97 of the designation control unit, the cards are stacked in the usual manner in a magazine 132, (Fig. 2), and pressed down in the magazine by a weight 133. The cards are removed from the magazine in succession by a reciprocating picker blade 134 which picks each card from the bottom of the stack and delivers it to feed rolls 135, 135', and these rolls in turn pass the card into the registration passage 97. The picker blade is oscillated by a rock-arm 136 suitably pivoted at 137 and having a laterally disposed pin 138, (see also Figs. 3 and 10), which, under one condition of operation, is engaged by the bifurcated end of a latch 139 pivoted to a bar 140 and normally held in latching position by a stretched spring 141. The bar 140 is reciprocated by a card feed timing cam 142 acting upon a roller 143 which is held thereagainst by a coil spring 144 working between a fixed abutment and a collar on the bar 140. Thus the card feed stroke is a positive one transmitted by the cam 142, bar 140 and latch 139 to the rock arm 136, while the nonworking stroke takes place by the action of the spring 144. The feed rolls 135, 135' are driven at the proper speed by a train of gears 145, (Fig. 1), from one of the gears 128.

After the cards leave the feed rolls 135, 135', a positive feeding of each card into position in the registration passage 97 and to the feed rolls 34, 34' takes place by the provision of hooks 146 respectively formed upon spring fingers 147, Fig. 19, secured to the upper registration plate 98, said hooks 146 extending down through recesses 148 in the edge of plate 98, and the points of the hooks extending down into ways or grooves 149 cut in the upper face of the edge of the lower plate 99 so as to insure the gripping of the card by the hooks. In this instance the plate 98 is mounted for transverse reciprocating movement upon the frame and has at two opposite ends strip pieces 150, (Figs. 1, 3, 4 and 5), which are fast thereon and have projecting pins 151 to respectively connect these pieces 150 to a pair of links 152 which are provided with hooks 153 to engage pins 154 on two upstanding rock levers 155 which are pivoted at 156 to opposite sides of the frame of the machine. Intermediate of the ends of these levers 155 cam rollers 157 are provided and held in operating engagement with feed control cams 158 by springs 159 stretched between the frames and the levers 155. The cams 158 have a contour which causes the levers 155 to operate hooks 153 to advance the card into the registration passage where it is locked against the stop plate 160 of the designation control analyzing pin box and when in such position the cam rollers 157 ride upon the rest portion or dwell of the cams 158 so that the arms 155 remain stationary momentarily during the analyzing of the card but immediately continue movement as soon as all of the pins have been removed from the card perforations so that the card is delivered to the feed rollers 34, 34'. The springs 150' draw the members 150 and plate 98 to the right in Fig. 1, and such movement is controlled by the movement of the pin 154. When the latch members 152 are raised with their hooks 153 out of engagement with pins 154, the plate 98 is locked by the card stop 160 against movement under influence of the springs 150' as the pin box is locked down at this time. When the pin box is unlocked, the latches 152 concomitantly move down into co-operative relation with the pins 154. The springs 152' hold the latches 152 in engagement with the bent over ends of bell cranks 174.

For the purpose of continuing the feeding of cards to the designation control pin box during the time a space-total, or a spacetotal-space operation is taking place, a supplemental card feed control mechanism is provided whereby the rate of card feeding is changed so that the related cycles take place in proper timed relation. In the present instance, this supplemental control mechanism consists of a link 161, (Fig. 7), pivoted at one end to one end of the pawl or hook 139 and having at its opposite end a pin and slot connection 162 to an arm 163 secured on the cross rod or shaft 76, which is arranged to be rocked by a control arm 164 held by a spring 165 in engagement with the face of a control cam 166 fast to the shaft 46 which cam rotates only when the clutch is thrown in. In the rest position of the cam 166 the arm 164 rides on the high portion of the cam whereby the hook or latch 139 is in engagement with the pin 138 of the normal feed mechanism, as shown in Fig. 2. When the cam moves sufficiently to permit the arm 164 to drop to the low part of the cam the train of linkage is operated so as to move the latch 139 to the position shown in Fig. 8 with the latch disengaged from the pin 138 of the normal feed mechanism. The dwell on the high part of the cam 166 is such that its movement permits the rock arm 136 to come to retracted position thus enabling the picker blade 134 to engage behind the next card to be fed toward the registration chamber 97, before the arms 163 and 164 move from the position shown in Fig. 7 to that shown in Fig. 8. When this occurs the rock arm 136 is released from the operating bar 140 and its pin 138 then comes under the control of an operating arm 167 pivoted at one end on a cross rod and having a pin 168 laterally located to ride on the face of a feed cam 169 under the influence of spring 170. This feed cam 169 is fixed to the shaft 46 and has a contour to give a relatively slow feeding stroke to the picker blade 134 and hence during the taking of a total there is no stopping of the card feed but the feed continues at a reduced rate until the card has been fed to close proximity with the feed rollers 135, 135', at which time the cam 166 through the arm 164 and its connections allows the latch 139 to be lowered for re-engagement with the pin 138 just as the bar 140 is retracting under its spring 144. Should the latch 139 then engage pin 138, the rock arm 136 and blade 134 would be retracted to where another card would be picked before the succeeding one had been advanced through the feed rolls 135, 135', resulting in a disarrangement of card feed sequence. To delay the engagement of latch 139 with pin 138 until the positive feed stroke of bar 140, the engaging notch of latch 139 is curved to provide a nose 171 which serves to prevent the engagement of pin 138 during a retracting stroke of bar 140, but which insures engagement on a positive stroke of the bar. With the proper engaging of latch 139 with pin 138, the card is fed to the feed rolls 135, 135', to be thus conveyed to the analyzing position. To further insure proper operation of the latch 139, the arm 167 is provided with a face 172 to engage a pin 173 on latch 139, as shown in Figs. 7, 8, 9 and 10. When the operations incident to a change of card group designation are complete, the second card of the next group is immediately brought to position for analyzing as the first card leaves the designation control pin box.

To prevent the feed fingers 147 from carrying the first card of the new group out of the designation control pin box at the time of space and total taking, the links 152, (Figs. 1, 3, 4 and 5), ride upon the bent over ends of pivoted bell cranks 174, which are operated through a pin and slot connection 175 by links 176 joined respectively by pin and slot connections to rocker arms 177 fixed to the shaft or cross rod 76. To insure the uniform action of bellcranks 174, the latter are connected by pin-and-slot connections to respective arms 205, Figs. 1 and 3, secured to a cross-shaft 206. The free ends of the bell-cranks 174 are notched as shown at 178 to receive step lugs 179 respectively projecting from the pin box operating rods 119. As shown in Fig. 4, rod 76 has been turned counter-clockwise by arm 164 hereinbefore described and the arm 177 has been moved to draw the link 176 to the left. The spring 180 normally holds link 176 toward the right with relation to arm 177, and a spring 181 tends to hold the lower arm or rock lever 174 to the left. However, at the time that the rod 76 is turned as in Fig. 4, the steps 179 have not yet reached their downmost position, and bellcranks 174 rest against steps 179. As the operation progresses, the parts assume the position shown in Fig. 5 with notches 178 over steps or stop lugs 179 locking the designation control analyzing pin box down during the space-total or space-total-space operation, and with the bent over upper ends of bell cranks 174 rocked up lifting members 152 until the hooks 153 are out of the path of pins 154 thereby preventing operation of the feed fingers 147 during the space-total or space-total-space operation.

In case a card does not feed into the registration passage 97, the analyzing stroke of the pin box 96 would cause all of the pins 89 to pass through the plates 98 and 99 and consequently all the pins 89 would be automatically locked down with the undesirable result of causing a total to be taken when there had been no change in designation. In order to prevent this, the pin box 96 is provided with one or more "no-card" control pins 182 located out of the recording field of the card, and in register with a hole or holes 183 through the plates 98 and 99. Preferably there are four of these pins 182, each being provided with a coil spring 184 to return it to normal projecting position. The heads 185 (Fig. 17), of these pins 182 are arranged in the path of shoulders 186 of the keepers 105 and have a length sufficient to allow the pins 182 to be pressed back, when a card covers the hole 183, to release the latch frame plates 112, but allow the downward or analyzing stroke of the pin box to take place without releasing the plates 112 in case no card is in analyzing position thereby preventing locking of any of the pins.

In describing the operation of the machine, it will be assumed that the mechanism is set for a space-total operation; that is, the shaft 46 has been moved to the position shown in Fig. 3, by pushing the hand knob 48 inwardly to bring the space-total cam 45 into operative relation with the cam roller 43. With the machine so set, the control plate 30 has its perforations registered with the respective perforations of the registration plates 21 and 22 and its space or total pin opening 187 provides an unrestricted passage for the total or space pin 24. A stack of cards comprising several groups having different designation control perforations is now placed in the magazine 132, and having started the machine, the first card is fed into the registration passage 97 of the designation analyzing unit. This feeding of the cards is a positive one because the hook fingers 146, 147 engage the rear edge of the card while the links 152 are moved by the rock levers 155, under the control of the cams 158 which act upon the cam rollers 157, to permit motion which brings the card into registered position, to allow the card to remain at rest for the necessary time interval, and then to resume feeding to eject the card to the feed rollers 34, 34'. When the card is in its registered position in the passage 97 the analyzing pin box 96 is lowered by the action of the cams 123 upon the rollers 122 of the reciprocable rods 119, and those analyzing pins 89 which find no perforations in the card are held against downward movement and as the pin box moves downward the plane of the latch lugs 106 is brought below their upper ends 104. When this happens, the cam rollers 114 have passed below the cams 113 of the standards 116 and the latch bars 105 thereupon quickly shift laterally so that the lugs 106 above pins which have passed through perforations in the card hold those pins against upward movement and in consequence force the aligned pins of the pin box 81 down. In case of a designation change, this motion of the downwardly moving designation control pin or pins causes the latch bar 93 or latch bars 93 to be moved to unlatching position, due to the cam faces 91, thus releasing the previously held pins and thereby releasing the plate 79 which is always normally down to hold the clutch inactive as indicated in Fig. 2, and hence the continued downward movement of these pins again lowers the plate 79 so that the rod 74 engages the pin 73 to hold the clutch ring 71 thereby effecting disengagement of the clutch through the co-action of the bevel face 72 and the pin 69. When the plate 79 reaches this position it is locked by the return of the latch 93 and hence no motion is transmitted to the shaft 46 as long as the card designation remains the same as that set. The cards of this group now feed successively through the designation control unit to the analyzing unit 20 of the tabulating machine, and the latter functions in its usual manner.

When the first card of the next group having a designation control different from the previous group enters the registration passage 97 the analyzing pins 89 will sense the change and in consequence different pins 83 will be forced down, and through their cam faces 91 will shift latch bars 93 to automatically release the formerly held pins so that the plate 79 rises under the influence of its springs 84. It should be noted, in order to allow a small time interval for the return of this plate 79, that the cams 123 have a dwell giving this required limited rest period to the pin box and the clutch which has been thrown in by the upward movement of plate 79, cannot be again disengaged until it has completed one revolution. The upward movement of the plate 79 at once withdraws the rod 74 from in front of the pin 73 so that the clutch is thrown in. This action transmits motion to the shaft 46 which through its cam 45 causes the bar 38 to rock the bent down end 37 and thereby cause the arms 33 and 32 to shift the slide plate 30 to a position where its perforations are out of register with the registration plate perforations, while its control opening 187 has been moved so that the shoulder 25 of the pin 24 is limited in its upward movement. The pin 24 therefore takes a position where the mechanism controlled by it causes the tabulating machine to perform a space operation. This space operation is completed after one reciprocation of the analyzing pin box 27 and the cam 45 will then shift its controlled parts so that the plate 30 again moves, being still out of register with the pin box perforations, but this time bringing its opening 187 to a position where the pin 24 has its shoulder 26 held by the plate 30, and in this position the pin causes its controlling mechanism to perform a total operation.

In order to change the rate of card feeding during the space-total operations, the first movement of the shaft 46 causes the cam 166 to release the arm 164 which then moves counter-clockwise, to turn the shaft 76 in the direction to cause the arm 163 to lift the latch 139 and thus release the card feed lever 136 from the actuating bar 140. The result of this is to leave the pin 138 operable by the supplemental feed control arm 167, which is moved under the influence of the feed control cam 169 due to the rotation of the shaft 46, and consequently there is no interruption in the feeding of cards though the rate of feed is reduced to time with the changed cycle of operations. The rocking of the shaft 76 also causes the rocker arms 177 to be moved counter-clockwise to transmit motion through the links 176 to the bell cranks 174 so that their upper ends lift the latches 152 from the pins 154 while their lower ends swing to bring the latch notches 178 into latching relation with the lugs 179 of the reciprocable rods 119 to thus hold the designation control pin box 96 against return by the springs 124 and prevent analyzing during the total cycle.

Where a space-total-space operation is desired, the knob 48 is pulled out to change the position of the shaft 46 so that the cam 44 engages the cam roller 42, while simultaneously a speed change is made by the meshing of the transmission gears 53 and 57. After such change the operation of the machine takes place as heretofore explained, except, in this instance the plate 30 has three positions instead of two, since there is the added space step after the total taking.

In case a card fails to feed into the designation analyzing unit passage 97, the working stroke of the pin box 96 will bring the pin or pins 182 down and each, in the absence of a card, will enter its hole 183 of the registration plates and consequently not be pressed upward to release the latch frame and its adjuncts. Hence a total will not be taken prematurely or during the run of a group of cards of the same designation.

While only a single form is shown in which this invention may be embodied, it is to be understood that the invention is not limited to any specific construction, but might be applied to various forms without departing from the spirit of the invention or the scope of the appended claims.

Having thus described my invention, I claim:

1. A perforated card controlled machine comprising a card analyzing unit, means for feeding cards successively to said unit, and a mechanism operated by a change of designation from one card group to another for causing said feeding means to operate at a different feeding rate during the change from one card group to another of different group designation.

2. A perforated card controlled machine comprising a card analyzing unit, means for feeding cards successively to said unit, and a mechanism operated by a change of designation from one card group to another for causing said feed means to continue operation during the change from one card group to another of different group designation.

3. A perforated card controlled machine comprising a card analyzing unit, a card magazine, a device for feeding cards successively from said magazine to said analyzing unit, means for actuating said device continuously while a group of cards of like designation are analyzed by said unit, a supplemental means for actuating said device, and means operated by a change of designation from one card group to another for substituting said supplemental actuating means for said continuously actuating means during the change from one card group to another.

4. A perforated card controlled machine comprising a card analyzing unit, a card magazine, a device for feeding cards successively from said magazine to said analyzing unit, means for actuating said device at a predetermined card feeding rate, supplemental means for operating said device at a rate different from said predetermined rate, and a mechanism operated by a change of designation from one card group to another for causing said supplemental means to operate in place of said actuating means.

5. A perforated card controlled machine comprising a card analyzing unit, a card magazine, a device for feeding cards successively from said magazine to said analyzing unit, means for actuating said device at a predetermined card feeding rate, supplemental means for actuating said device at a slower rate than said actuating means, and a mechanism controlled by said analyzing unit for automatically selecting the actuating means to be operated.

6. In a perforated card controlled machine the combination of a main operating mechanism, an analyzing unit, means for feeding cards successively to said unit at a predetermined rate, a total mechanism, and means operated through said analyzing unit by a change of card group designation for operating said total mechanism and causing said card feeding means to operate at a different rate relative to said main operating mechanism.

7. In a perforated card controlled machine the combination of an analyzing unit, means for feeding cards successively to said unit at a predetermined rate, a total mechanism, means operated through said analyzing unit by a change of card group designation for operating said total mechanism and causing said card feeding means to operate at a different rate, and means for restoring said feeding mechanism to its predetermined rate after said total mechanism has completed its cycle.

8. In a perforated card controlled machine, the combination of an analyzing unit, a device for feeding cards successively to said unit, a plurality of means for actuating said device, a total mechanism, and means operated through said analyzing unit for operating said total mechanism, and automatically selecting one of said actuating means to operate said feeding device during the operation of said total mechanism.

9. In a perforated card controlled machine, the combination of a card feed mechanism, means for causing said mechanism to operate at one speed for analyzing perforated cards having the same group designation, and means automatically operated by a change of group designation for causing said feeding mechanism to operate at a different speed for total taking operations.

10. In a perforated card controlled machine, the combination of a reciprocable card analyzing unit, a total operating mechanism, a reciprocable bar operating in timed relation to said analyzing unit, means for feeding cards to said analyzing unit, means for connecting said feeding means to said bar to operate said feeding means, and means operated when said total operating mechanism functions to automatically disconnect said feeding means from said bar.

11. In a perforated card controlled machine, the combination of a reciprocable card analyzing unit, a total operating mechanism, a reciprocable bar operating in timed relation to said analyzing unit, means for feeding cards to said analyzing unit, means for connecting said feeding means to said bar to operate said feeding means, means operated when said total operating mechanism functions to automatically disconnect said feeding means from said bar, and means for operating said feeding means while disconnected from said bar.

12. In a perforated card controlled machine, the combination of a reciprocable card analyzing unit, a total operating mechanism, a reciprocable bar operating in timed relation to said analyzing unit, means for feeding cards to said analyzing unit, means for connecting said feeding means to said bar to operate said feeding means, means operated when said total operating mechanism functions to automatically disconnect said feeding means from said bar, and means including a cam controlled arm for operating said feeding means while disconnected from said bar.

13. In a perforated card controlled machine, the combination of an analyzing unit, and means for feeding cards to said analyzing unit at two different rates, said means including a continuously rotating shaft, an auxiliary intermittently operated shaft, cam members controlled by said auxiliary shaft, a clutch for transmitting motion from one of said shafts to the other, and means controlled by a record card for actuating said clutch.

14. A tabulating machine including a control for a total operation, a card analyzing unit for said machine provided with a card registration passage, means movably mounted in said registration passage for governing said total control, and group designation control means for automatically moving said governing means.

15. A tabulating machine including a control for a total operation, a card analyzing unit for said machine provided with a card registration passage, and means including a movable plate in said registration passage for controlling said total control automatically upon a change of group designation in a stack of perforated cards.

16. A tabulating machine including a mechanism for causing said machine to take a total, a total pin for controlling said mechanism, and a movable plate controlled by a change of designation from a card of one group to a card of another group for controlling said pin.

17. A tabulating machine including a mechanism for causing said machine to perform a space operation, a space pin for controlling said mechanism, means arranged to co-operate with said space pin to control its operation, and means caused to function by a change of designation from a card of one group to a card of another group for operating said control means.

18. A tabulating machine including a mechanism for causing said machine to perform a space-total operation: a pin for controlling said mechanism, said pin having one position for space operation and another position for total operation, means for selectively controlling the positions of said pin, and means caused to function by a change of designation from a card of one group to a card of another group for operating said control means.

19. A tabulating machine including a mechanism for causing said machine to perform a space-total operation, a pin for controlling said mechanism, said pin having one position for space operation and another position for total operation, means for successively locating said pin in its operating positions, and means caused to function by a change of designation from a card of one group to a card of another group for operating said locating means.

20. A tabulating machine including a mechanism for causing said machine to perform a space-total operation, a pin for controlling said mechanism, said pin having one position for space operation and another position for total operation, means including a shiftable member for successively locating said pin in its operating positions, and means caused to function by a change of designation from a card of one group to a card of another group for operating said shiftable member in a predetermined manner.

21. A tabulating machine including a mechanism for causing said machine to take a total, a total pin for controlling said mechanism, means including a member shiftable across the path of said total pin for positioning said total pin in total taking position, and means caused to function by a change of designation from a card of one group to a card of another group for operating said shiftable member.

22. A tabulating machine including a mechanism for causing said machine to perform a space operation, a pin for controlling said mechanism, means including a shiftable member for positioning said pin in space operating position, and means caused to function by a change of designation from a card of one group to a card of another group for operating said shiftable member.

23. A tabulating machine including a mechanism for causing said machine to perform a space-total-space operation, a pin for controlling said mechanism, means including a shiftable member for controlling the position of said pin, and means caused to function by a change of designation from a card of one group to a card of another group for successively locating said pin in space control position, in total control position, and in space control position.

24. A tabulating machine including a control for a total operation, a card analyzing unit for said machine provided with a card registration passage, a perforated plate slidably mounted at one side of said passage, means controlled by said plate for initiating operation of said total control, and group designation control means for automatically shifting said plate to cause said total control to function.

25. A tabulating machine including a control for a space operation, a card analyzing unit for said machine provided with a card registration passage, a perforated plate slidably mounted at one side of said passage, means controlled by said plate for initiating operation of said space control, and group designation control means for automatically shifting said plate to cause said space control to function.

26. A tabulating machine including a mechanism for causing said machine to perform a space operation, a space pin for controlling said mechanism, a perforated plate slidably mounted to assume a position in the path of said pin, and means caused to function by a change of designation from a card of one group to a card of another group for actuating said plate to cause a space operation.

27. A tabulating machine including a mechanism for causing said machine to perform a space-total operation, a pin for controlling said mechanism, said pin having one position for space operation and another position for total operation, a perforated plate slidably mounted to assume different positions to control said pin, and means caused to function by a change of designation from a card of one group to a card of another group for actuating said plate to successively position said pin for a space operation and a total operation.

28. A tabulating machine including a mechanism for causing said machine to perform a total operation, a movable control pin for said mechanism having a shoulder to locate said pin to cause said mechanism to operate, a perforated plate slidably mounted across the path of said pin and having an opening normally allowing free passage of said pin shoulder, and means caused to function by a change of designation from a card of one group to a card of another group for shifting said plate opening out of register with said pin shoulder whereby the stroke of said pin is changed and said mechanism perform a total operation.

29. A tabulating machine including a mechanism for causing said mechanism to perform a space-total operation, a movable control pin for said mechanism having two shoulders of different dimensions arranged respectively to locate said pin in space and total control positions, a perforated plate slidably mounted across the path of said pin and having an opening normally allowing free passage of both of said pin shoulders, and means caused to function by a change of designation from a card of one group to a card of another group for shifting said plate opening to bring said plate successively into the path of said shoulders, whereby the stroke of said pin is changed and said mechanism performs successively a space operation and a total operation.

30. A designation controlled mechanism comprising an analyzing unit comprising a plurality of movable pins, a control unit formed of a plurality of movable pins, the said units being arranged in superposed relation with the pins thereof respectively in aligned relation, registration plates forming a card registration passage between said units, mechanism for feeding cards to said passage, means to bring said cards to registered position and discharging said cards from said passage, means for automatically locking selected analyzing unit pins, a plate movably mounted in the path of the pins of said control unit, means for locking said plate in position determined by the operation of selected control pins, and means controlled by said plate for stopping the operation of said analyzing unit.

31. A designation controlled mechanism comprising an analyzing unit comprising a plurality of rows of movable pins, a latch device for positively operating pins which find perforations, said device being adjustable to select a row of pins for designation control, means for supporting said latch device for movement transverse to said pins, and means automatically operated in a predetermined position of said pins for causing said latch to function.

32. A designation controlled mechanism comprising an analyzing unit comprising a plurality of rows of movable pins, means for reciprocating said unit, a latch device for selecting any row of said pins for designation control, means for supporting said latch device for movement transverse to said pins, spring means for moving said supporting means, and means including fixed cam standards for releasing said supporting means to cause said latch to function at a predetermined part of the reciprocation of said unit.

33. A mechanism for perforated card controlled machines comprising a pair of registration plates spaced to form a card passage, a reciprocable card feeding means in said passage, means for actuating said feeding means, and means for varying the action of said feeding means.

34. A mechanism for perforated card controlled machines comprising a pair of registration plates spaced to form a card passage, a reciprocable card feeding means in said passage, means for actuating said feeding means, and means moving said feeding means a predetermined distance, bringing said feeding means to rest, and causing the feeding means to resume operations.

35. A tabulating machine including a mechanism for causing said machine to take a total, a card analyzing unit for said machine provided with a card registration passage, means operated by a change of designation from a card of one group to a card of another group for operating said total mechanism, and means caused to function by the absence of a card in said passage, for preventing operation of said total taking means.

36. A tabulating machine including a mechanism for causing said machine to take a total, a card analyzing unit for said machine provided with a card registration passage, means brought into operation by a change of designation from a card of one group to a card of another group for operating said total mechanism, and means caused to function by a card out of registering position for preventing operation of said total taking means.

37. A tabulating machine including a mechanism for causing said machine to take a total, a card analyzing unit for said machine provided with a card registration passage, means brought into operation by a change of designation from a card of one group to a card of another group for operating said total mechanism, and means, including an auxiliary pin caused to function by the absence of a card for preventing operation of said total operating means.

38. A tabulating machine including a mechanism for causing said machine to take a total, a card analyzing unit for said machine provided with a card registration passage, means operated by a change of designation from a card of one group to a card of another group for operating said total mechanism, and means, including a pin outside the perforated field of the card and caused to function by the absence of a card in said passage, for preventing operation of said total taking means.

39. A designation controlled mechanism comprising an analyzing unit comprising a plurality of rows of movable pins, a latch device arranged to move to a position to lock certain of said pins, and means automatically operative in the absence of a card during an analyzing stroke for preventing operation of said latch device.

40. A designation controlled mechanism comprising an analyzing unit comprising a plurality of rows of movable pins, a latch device arranged to move to a position to lock certain of said pins, a stop on said latch device, a control pin normally engaging said stop and arranged to be automatically moved out of the path of said stop when the card is in registered position whereby said latching device is caused to function.

41. An attachment for perforated card controlled machines comprising a designation control analyzing unit, means for feeding cards successively to said unit and discharging said cards therefrom, means for reciprocating said analyzing unit in timed relation with the analyzing unit of the card controlled machine, means for causing a total to be taken by said card controlled machine, cam operated means for controlling said total taking means, and means controlled by said designation controlled analyzing unit for normally rendering said cam means ineffective.

42. An attachment for perforated card controlled machines comprising a designation controlled analyzing unit, means for feeding cards successively to said unit and discharging said cards therefrom, means for reciprocating said analyzing unit in timed relation with the analyzing unit of the card controlled machine, means for causing a total to be taken by said card controlled machine, cam operated means for controlling said total taking means, and clutch control means controlled by said designation controlled analyzing unit for normally rendering said cam means ineffective.

43. An attachment for perforated card controlled machines comprising a designation controlled analyzing unit, means for feeding cards successively to said unit and discharging said cards therefrom, means for reciprocating said analyzing unit in timed relation with the analyzing unit of the card controlled machine, means for causing a total to be taken by said card controlled machine, a cam operated means for controlling said total taking means, a driving mechanism, a clutch arranged to connect said cam means with said driving mechanism, and means controlled by said designation analyzing unit for operating said clutch.

44. In a card-controlled mechanism, an analyzing unit comprising a plurality of rows of analyzing pins, means to reciprocate said unit, card feeding devices for delivering and discharging cards to and from said analyzing unit, and a selecting mechanism including a removable latch bar extending along a row of pins and cooperating with the pins of said row to render them operative for analyzing purposes.

45. The combination of a main operating mechanism acting in cycles, a card feeding mechanism normally acting to feed one card for each cycle, and means for causing said card feeding means to act at a slower rate so as to feed one card to a plurality of cycles of the main operating mechanism.

46. The combination of a main operating mechanism acting in cycles, card feeding means normally acting to feed one card for each cycle, means for sensing a designation in the cards, and means controlled by said sensing means for reducing the rate of operation of said card feeding means so as to cause the latter to feed one card for a plurality of cycles of said main operating mechanism.

47. The combination of a main operating mechanism acting in cycles, card feeding means normally feeding one card for each cycle, means for setting the machine for a space-total operation, and means for changing the rate of operation of said card feeding means so as to cause the latter to feed one card only during the spacing and total taking cycles.

ROBERT EDWARD PARIS.